United States Patent
Pezzini

(10) Patent No.: US 7,120,718 B2
(45) Date of Patent: Oct. 10, 2006

(54) METHOD FOR GENERATING INTERRUPT COMMANDS IN A MICROPROCESSOR SYSTEM AND RELATIVE PRIORITY INTERRUPT CONTROLLER

(75) Inventor: Saverio Pezzini, Vimercate (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 122 days.

(21) Appl. No.: 10/717,177

(22) Filed: Nov. 19, 2003

(65) Prior Publication Data

US 2004/0177192 A1    Sep. 9, 2004

(30) Foreign Application Priority Data

Nov. 19, 2002    (EP) .................................. 02425709

(51) Int. Cl.
*G06F 13/26* (2006.01)
(52) U.S. Cl. ...................... 710/265; 710/260; 710/263; 710/264
(58) Field of Classification Search ................ 710/260, 710/269, 263, 264, 265
See application file for complete search history.

(56) References Cited

U.S. PATENT DOCUMENTS

| | | | |
|---|---|---|---|
| 5,241,632 A * | 8/1993 | O'Connell et al. ......... 710/117 |
| 5,257,357 A | 10/1993 | Yishay et al. |
| 5,274,774 A * | 12/1993 | Manber et al. ............. 710/125 |
| 5,381,552 A | 1/1995 | Dahlberg et al. |
| 5,392,033 A * | 2/1995 | Oman et al. ............. 340/825.5 |
| 5,918,057 A * | 6/1999 | Chou et al. .................. 710/260 |
| 6,163,829 A * | 12/2000 | Greim et al. ............... 710/260 |
| 6,581,120 B1 * | 6/2003 | Ko .............................. 710/262 |
| 6,715,093 B1 * | 3/2004 | Farmer et al. ............. 713/400 |
| 6,807,595 B1 * | 10/2004 | Khan et al. ................. 710/260 |
| 2002/0181455 A1 * | 12/2002 | Norman et al. ............. 370/389 |

FOREIGN PATENT DOCUMENTS

GB    2360612    9/2001

* cited by examiner

*Primary Examiner*—Mark H. Rinehart
*Assistant Examiner*—Matthew Spittle
(74) *Attorney, Agent, or Firm*—Lisa K. Jorgenson; Allen, Dyer, Doppelt, Milbrath & Gilchrist, P.A.

(57) ABSTRACT

A method for generating interrupt commands for a microprocessor system includes storing interrupts in a pending interrupts register, and storing priority values associated with the stored interrupts in a plurality of priority registers coupled to the pending interrupts register. A plurality of counters coupled in cascade to the plurality of priority registers are loaded with the stored priority values. The loaded priority values are incremented at predetermined intervals, and are compared for identifying the interrupt having a highest priority. The method further includes identifying a respective interrupt service routine to be executed based upon the interrupt having the highest priority.

17 Claims, 3 Drawing Sheets

METHOD FOR GENERATING INTERRUPT COMMANDS IN A MICROPROCESSOR SYSTEM AND RELATIVE PRIORITY INTERRUPT CONTROLLER

FIELD OF THE INVENTION

The present invention relates in general to microprocessor systems, and in particular, to a method for generating interrupts in a microprocessor system and a corresponding interrupt controller with automatically incremented priority values as a function of the latency time and of the time limit within which the relative interrupt is to be processed.

BACKGROUND OF THE INVENTION

During the functioning of a processor, it may be necessary to interrupt the execution of a program for carrying out particular instructions. This is done by way of signals called interrupts. An interrupt controller receives these signals, and depending on the received interrupt, sends to the microprocessor an interrupt command and an interrupt vector that specifies the memory address where an interrupt service routine (ISR) to be run is stored.

The microprocessor stops the operation in progress, saves the state of the program that was executing so that it may be resumed later, and carries out the instructions of the respective ISR based upon the received interrupt. When the ISR finishes, the microprocessor restores the state of the program, and if there is not any other pending interrupt, resumes its execution from the point at which it had been interrupted.

Interrupt controllers commonly have priority registers that allow them to establish which interrupt among the many received and pending interrupts is to be processed first. A basic architecture of a known priority interrupt controller is depicted in FIG. 1. The interrupts INT0, ..., INTm coming from peripherals are loaded in a pending interrupt register INT PENDING REG.

The circuit block IRQ MASK AND PRIORITY LOGIC comprises both the interrupts mask and a priority logic circuitry that receives an interrupt together with its priority level provided by the dedicated registers PRIORITY REGISTERS. The priority logic generates an interrupt request signal IRQ REQ and stores the relative priority HIGHEST PRIORITY INT in the register CURR IRQ PRIORITY REG.

The dashed perimeter delimits the circuit that processes the interrupt request signal and its priority HIGHEST PRIORITY INT. A state machine IRQ SM forms the core of the controller that receives the interrupt request signal and sends an interrupt command nIRQ to the processor. The interrupt request signal IRQ REQ selects an interrupt vector IRQ VECTOR corresponding to the required interrupt read from an interrupt table IRQ VECTOR REG containing interrupt vectors identifying ISR routines.

FIG. 1 shows registers CURR IRQ PRIORITY REG and PRIORITY STACK used for managing the nested interrupts. The register CURR IRQ PRIORITY REG stores the priority of the currently served interrupt. Should an interrupt with a higher priority be generated, the processing of the first interrupt is stopped and its priority is stored in the register PRIORITY STACK, and the new interrupt of the higher priority is processed and its priority is stored in the register CURR IRQ PRIORITY REG.

Once the processing of the interrupt is completed, the previously suspended interrupt is processed provided its priority has remained the highest of the priorities of all pending interrupts. When the processing of any interrupt is completed, its priority is canceled from the stack PRIORITY STACK by a command STACK PUSH/POP of the state machine IRQ SM.

An important parameter of interrupt controllers is the latency time of interrupts, that is, the time that elapses from the instant of reception of the interrupt in the register INT PENDING REG and the instant in which it is processed. It is always desirable that this time lag be as short as possible. Moreover, an interrupt must be processed within a certain maximum time (dead line) from the instant in which it is loaded in the pending interrupt register, otherwise the application managed by the running program may not function properly.

To prevent an interrupt from being processed after a pre-established dead line, the priority registers in known controllers are re-programmed at pre-established intervals. The duration of these intervals vary as a function of the register increasing the priority level of interrupts as a function of their latency in the pending interrupt register. In this way, interrupts with a longer latency are given a higher priority than the interrupts that have just been received, and are eventually processed before their latency reaches the dead line.

In contrast, the priorities of interrupts stored in the stack PRIORITY STACK are not incremented for preventing an interrupt previously suspended in favor of an incoming interrupt having a higher priority from suspending the processing of the incoming interrupt, and so on. Unfortunately, this technique of re-programming is not very convenient because the recurrent task of re-programming the priority registers burdens the microprocessor, thus slowing execution of the program.

SUMMARY OF THE INVENTION

An object of the present invention is to provide a method for generating interrupt commands in a microprocessor system that overcomes the drawbacks of the known techniques based upon re-programming the priority registers at intervals.

According to the present invention, it is possible to increase automatically the priority values of the pending interrupts without burdening the microprocessor with such a task. This result is obtained by using counters dedicated to store the effectively used priority values for determining which interrupt is to be processed first. When an interrupt is received, a relative counter containing the respective priority value is incremented at pre-established time intervals by an increment signal.

This and other objects, advantages and features in accordance with the present invention are provided by a method being implemented in an interrupt priority control circuit for a microprocessor system. The interrupt priority control circuit includes priority registers for storing priority values associated with respective possible interrupts, one or more pending interrupt registers, a priority logic circuit for generating an interrupt request signal and an internal signal representing the relative priority, and a circuit for processing the interrupt signal and the internal signal that eventually sends to a system processor an interrupt command and an interrupt vector.

The interrupt control circuit does not require intervention of the system processor to increment the priority values of pending interrupts as a function of their latency because it comprises a plurality of counters coupled to the priority registers that are initialized with the priority values of all types of interrupts to be served. Each counter receives an increment signal of its content and the priority logic circuitry reads from the updated counters the priority value associated to each interrupt. Preferably, the counters are incremented by respective signals because the priorities of each interrupt may vary differently depending on the type of interrupt.

BRIEF DESCRIPTION OF THE DRAWINGS

The different aspects and advantages of the present invention will become more evident through a detailed description of the invention and by referring to the attached drawings, wherein.

DETAILED DESCRIPTION OF THE PREFERRED EMBODIMENTS

Figure 1:
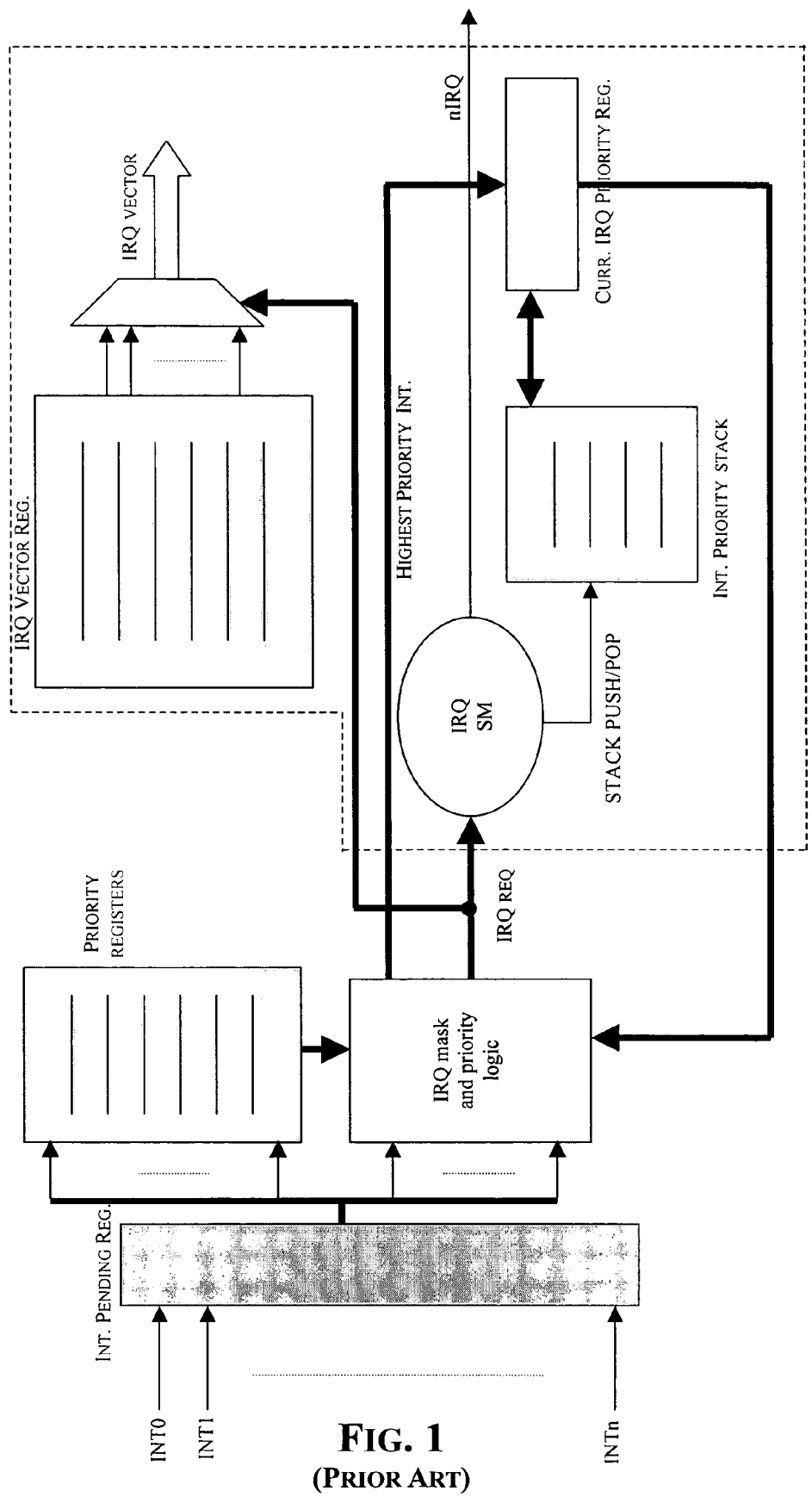
FIG. 1 depicts a commonly known interrupt controller according to the prior art.
Figure 2:
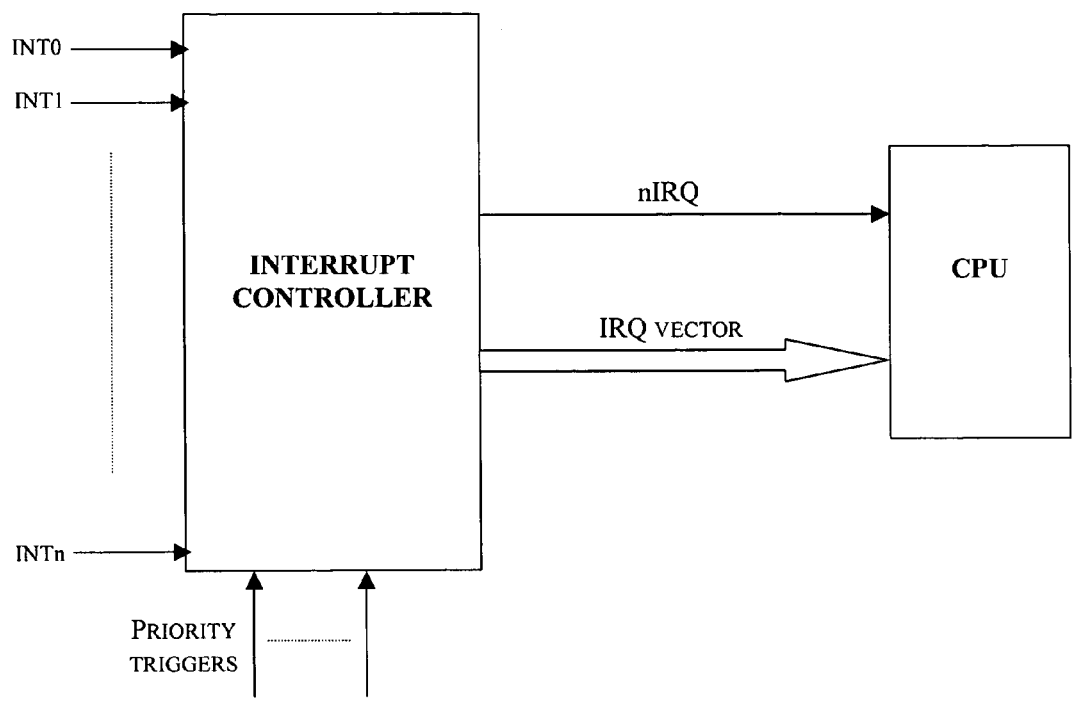
FIG. 2 shows the general architecture of a system using an interrupt controller according to the present invention.

A basic architecture of a system using an interrupt controller INTERRUPT CONTROLLER in accordance with the present invention is depicted in FIG. 2. Differently from the prior art controller of FIG. 1, the INTERRUPT CONTROLLER block is input also with the signals PRIORITY TRIGGERS that are used to increment the priority of pending interrupts. This is done to prevent the interrupts from remaining unprocessed for a time exceeding a certain pre-established maximum dead line time.

Figure 3:
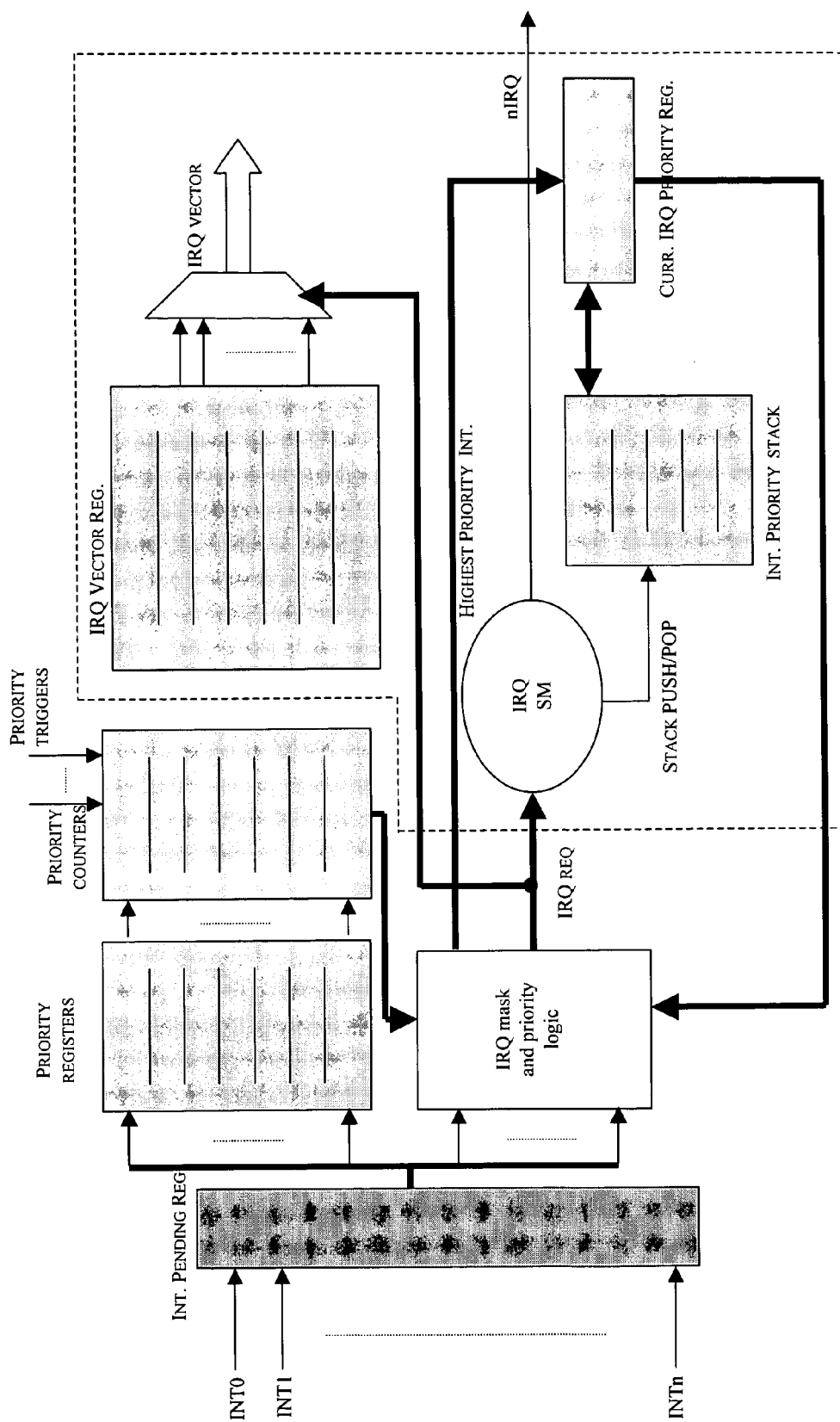
FIG. 3 shows a detailed architecture of an interrupt controller according to the present invention.

A preferred embodiment of the interrupt controller of the present invention is depicted in FIG. 3. Basically, it differs from the known controller of FIG. 1 because of the presence of a plurality of priority counters PRIORITY COUNTERS connected in cascade to the PRIORITY REGISTERS and from which the circuit IRQ MASK AND PRIORITY LOGIC reads the priority values for identifying the highest priority.

When an interrupt is loaded in the register INT. PENDING REG. the corresponding counter previously loaded with the value stored in the corresponding PRIORITY REGISTER is enabled to be periodically incremented by the respective increment signal of the signals fed to the counters block PRIORITY COUNTERS. The circuit IRQ MASK AND PRIORITY LOGIC reads from the periodically incremented counters the priority values, identifies which of the pending interrupts has the highest priority, generates an interrupt request IRQ REQ that is sent to the state machine IRQ SM and an internal signal HIGHEST PRIORITY INT representing the priority of the interrupt INTn that must be served.

At this time, the counter that stores the priority value relative to the saved interrupt INTn is re-initialized with the original priority value. The count is stopped and the interrupt INTn is canceled from the pending interrupt register.

The priority values of all the pending interrupts stored in the counters PRIORITY COUNTERS are incremented at pre-established time intervals that may be different from counter to counter by respective increment signals PRIORITY TRIGGERS. In this way the priority of a pending interrupt is automatically incremented via hardware. By so doing, interrupts are eventually served before their latency reaches the dead line time. The controller advantageously frees the microprocessor from the task of re-writing at pre-established intervals the content of the priority registers.

To manage nested interrupts, the controller may be provided with the registers CURR IRQ PRIORITY REG and PRIORITY STACK, as in the controller of FIG. 1. For example, the increment signals fed to the counters may be derived from the clock signal of the controller. They may be generated by frequency dividers or they may be derived from an external clock signal coming from the operating system, or they may be generated by events external or internal to the microprocessor. For example, they may be the result of a comparison or a signal applied to a pin of the device.

Preferably, each counter is incremented by a respective increment signal to allow the priorities to be differently incremented depending on the type of interrupt to which each of them refers. Preferably, the increment signal of a counter has a period chosen as a function of the allowed maximum latency so that the relative interrupt may reliably reach the top priority value before the time limit elapses. To insure this, the period of the increment signal will be made shorter than the ratio between the allowed maximum latency and the difference between the expected maximum and minimum priority values.

That which is claimed is:

1. A method for generating interrupt commands for a microprocessor system, the method comprising:

storing interrupts in a pending interrupts register;

storing priority values associated with the stored interrupts in a plurality of priority registers coupled to the pending interrupts register;

loading a plurality of counters coupled in cascade to the plurality of priority registers with the stored priority values;

incrementing at predetermined intervals the priority values loaded in the plurality of counters;

comparing the incremented priority values for identifying the interrupt having a highest priority if an interrupt service routine is not being executed;

processing the interrupt having the highest priority by generating an interrupt command and an interrupt vector identifying the interrupt service routine to be executed;

canceling the interrupt having the highest priority from the pending interrupts register and its priority value from the plurality of priority registers; and wherein the incrementing is based upon increment signals having different periods, each period corresponding to a particular interrupt that is associated with a corresponding counter and the increment signal of one of the plurality of counters has a period shorter than a ratio between a maximum latency of one of the interrupts and a difference between maximum and minimum priority values.

2. A method according to claim 1, further comprising performing the following for managing nested interrupts:

storing the priority value of the interrupt being processed in a memory buffer;

comparing the priority values stored in the plurality of counters with the priority value stored in the memory buffer for identifying a new interrupt having the highest priority;

if the new interrupt has the highest priority, then stopping execution of the interrupt service routine and storing in a stack register the priority value corresponding to the interrupt service routine whose execution was stopped;

generating a new interrupt command and a new interrupt vector for identifying a new interrupt service routine to be executed based upon the new interrupt having the highest priority; and canceling the priority value from the stack register corresponding to the interrupt service routine whose execution was recently serviced.

3. A method for generating interrupt commands for a microprocessor system, the method comprising:

storing interrupts in a pending interrupts register;

storing priority values associated with the stored interrupts in a plurality of priority registers coupled to the pending interrupts register;

loading a plurality of counters coupled in cascade to the plurality of priority registers with the stored priority values;

incrementing at predetermined intervals the priority values loaded in the plurality of counters;

comparing the incremented priority values for identifying the interrupt having a highest priority;

processing the interrupt having the highest priority; and wherein the incrementing is based upon increment signals having different periods, each period corresponding to a particular interrupt that is associated with a corresponding counter, and the increment signal of one of the plurality of counters has a period shorter than a ratio between a maximum latency of one of the interrupts and a difference between maximum and minimum priority values.

4. A method according to claim 3, wherein processing the interrupt having the highest priority comprises generating an interrupt command and an interrupt vector identifying an interrupt service routine to be executed.

5. A method according to claim 3, further comprising canceling the interrupt having the highest priority from the pending interrupts register and its priority value from the plurality of priority registers after processing the interrupt having the highest priority.

6. A method according to claim 4, further comprising performing the following for managing nested interrupts:

storing the priority value of the interrupt being processed in a memory buffer;

comparing the priority values stored in the plurality of counters with the priority value stored in the memory buffer for identifying a new interrupt having the highest priority;

if the new interrupt has the highest priority, then stopping execution of the interrupt service routine and storing in a stack register the priority value corresponding to the interrupt service routine whose execution was stopped;

generating a new interrupt command and a new interrupt vector for identifying a new interrupt service routine to be executed based upon the new interrupt having the highest priority; and canceling the priority value from the stack register corresponding to the interrupt service routine whose execution was stopped.

7. A control circuit for generating interrupt commands for a microprocessor system comprising:

a pending interrupts register for storing interrupts;

a plurality of priority registers coupled to said pending interrupts register for storing priority values associated with the stored interrupts;

a plurality of counters coupled in cascade to said plurality of priority registers and being loaded with the stored priority values, the stored priority values being incremented at predetermined intervals;

a priority comparing circuit coupled to said plurality of counters and to said pending interrupts register for comparing the incremented priority values for identifying the interrupt having a highest priority if an interrupt service routine is not being executed, and generating an interrupt request signal and an internal signal corresponding to the interrupt having the highest priority stored in said pending interrupts register;

a logic processing circuit coupled to said priority comparing circuit and receiving the interrupt request signal and the internal signal, and generating for the microprocessor system an interrupt command and an interrupt vector identifying an interrupt service routine to be executed; and wherein the incrementing is based upon increment signals having different periods, each period corresponding to a particular interrupt that is associated with a corresponding counter and the increment signal of one of the plurality of counters has a period shorter than a ratio between a maximum latency of one of the interrupts and a difference between maximum and minimum priority values.

8. A control circuit according to claim 7, wherein said plurality of counters receive increment signals derived from a system clock signal or from externally generated timing signals.

9. A control circuit according to claim 8, wherein the increment signals have respective periods that are a multiple of a period of the system clock signal.

10. A control circuit according to claim 9, wherein the increment signals have different periods.

11. A control circuit according to claim 7, wherein the interrupts are nested, and wherein said logic processing circuit comprises:

a memory buffer coupled to said priority comparing circuit for storing the priority value of the interrupt being represented by the internal signal; and a stack register coupled to said memory buffer for storing the priority value corresponding to the interrupt service routine whose execution was stopped because of a new interrupt having a higher priority value.

12. A microprocessor system comprising:

a microprocessor; and a control circuit for generating interrupt commands for said microprocessor, said control circuit comprising a pending interrupts register for storing interrupts, a plurality of priority registers coupled to said pending interrupts register for storing priority values associated with the stored interrupts, a plurality of counters coupled in cascade to said plurality of priority registers and being loaded with the stored priority values, the stored priority values being incremented at predetermined intervals, a priority comparing circuit coupled to said plurality of counters and to said pending interrupts register for comparing the incremented priority values for identifying the interrupt having a highest priority, a logic processing circuit coupled to said priority comparing circuit and generating for said microprocessor an interrupt command and an interrupt vector identifying an interrupt service routine to be executed, and wherein the incrementing is based upon increment signals having different periods, each period corresponding to a particular interrupt that is associated with a corresponding counter and the increment signal of one of the plurality of counters has a period shorter than a ratio between a maximum latency of one of the interrupts and a difference between maximum and minimum priority values.

13. A microprocessor system according to claim 12, wherein said priority comparing circuit generates an interrupt request signal and an internal signal representing the interrupt having the highest priority stored in said pending interrupts register; and wherein said logic processing circuit receives the interrupt request signal and the internal signal for generating the interrupt command and the interrupt vector identifying the interrupt service routine to be executed.

14. A microprocessor system according to claim 12, wherein said plurality of counters receives increment signals derived from a system clock signal or from externally generated timing signals.

15. A microprocessor system according to claim 14, wherein the increment signals have respective periods that are a multiple of a period of the system clock signal.

16. A microprocessor system according to claim 15, wherein the increment signals have different periods.

17. A microprocessor system according to claim 12, wherein the interrupts are nested, and wherein said logic processing circuit comprises:

a memory buffer coupled to said priority comparing circuit for storing the priority value of the interrupt corresponding to the internal signal; and a stack register coupled to said memory buffer for storing the priority value corresponding to the interrupt service routine whose execution was stopped because of a new interrupt having a higher priority value.

* * * * *